(No Model.)
R. R. LOMAX.
ATTACHMENT FOR CULTIVATORS.
No. 317,392. Patented May 5, 1885.
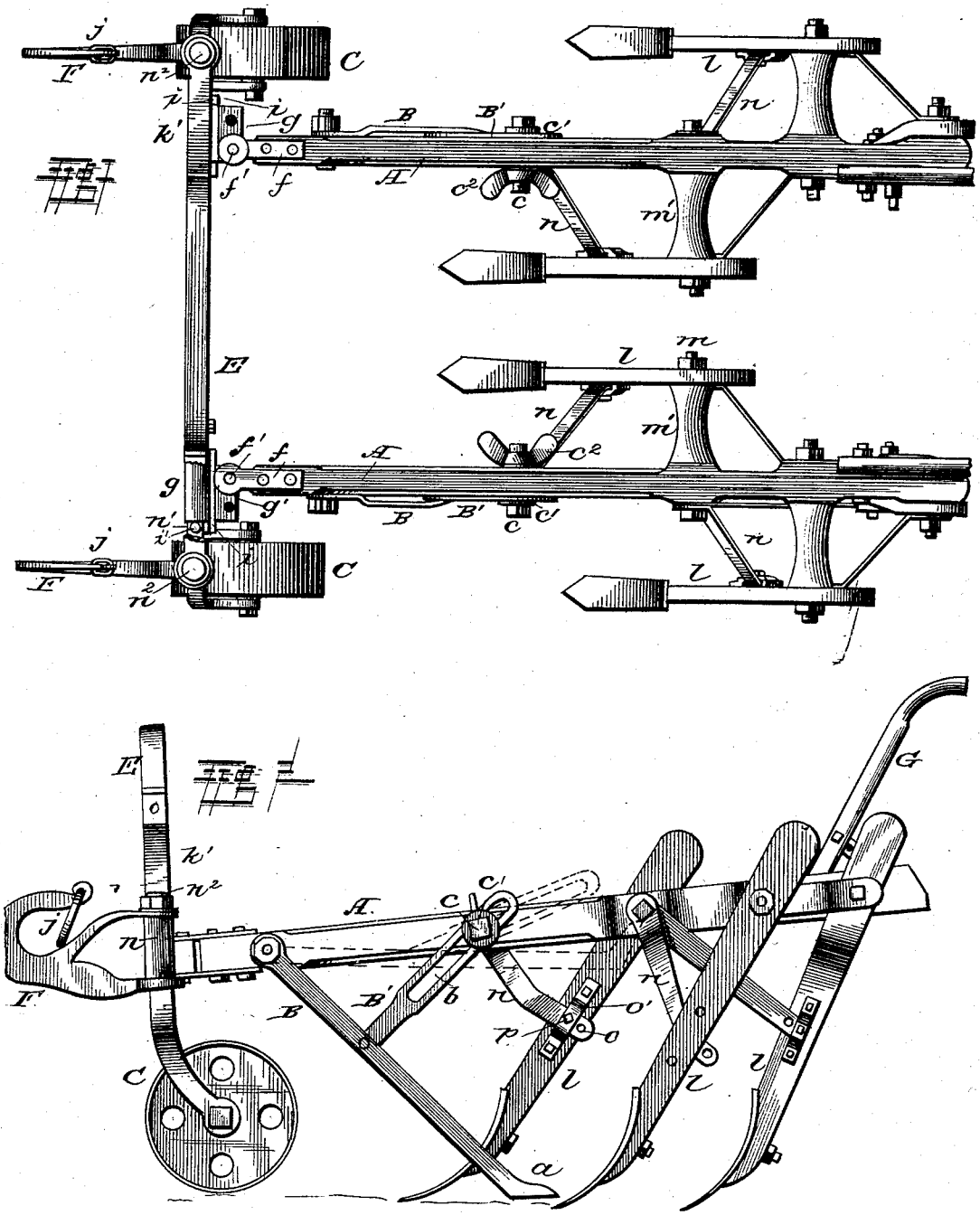

UNITED STATES PATENT OFFICE.

RUSH R. LOMAX, OF PLUM HOLLOW, IOWA.

ATTACHMENT FOR CULTIVATORS.

SPECIFICATION forming part of Letters Patent No. 317,392, dated May 5, 1885.

Application filed July 30, 1884. (No model.)

*To all whom it may concern:*

Be it known that I, R. R. LOMAX, a citizen of the United States, and a resident of Plum Hollow, in the county of Fremont and State of Iowa, have invented certain new and useful Improvements in Harrow Attachments for Cultivators; and I do hereby declare that the following is a full, clear, and exact description of the invention, which will enable others skilled in the art to which it appertains to make and use the same, reference being had to the accompanying drawings, which form a part of this specification.

This invention pertains to improvements in attachments for cultivators, having for its object, principally, to vary the angle of presentation of the plows or shovels to the ground, and to dispense with a draft pole or tongue; and it consists of the combination of parts, together with their construction, substantially as hereinafter fully set forth, and pointed out in the claim.

In the accompanying drawings, Figure 1 is a plan view of a cultivator embodying my invention. Fig. 2 is a side elevation thereof, showing in full lines the beam-adjusting devices in use, said devices being also shown in dotted lines folded or out of use.

In carrying out my invention I employ, in connection with the shovel or plow-beams A of a corn-cultivator, (although this invention is applicable to any agricultural implement using beams to carry the shovel or plow standards,) an adjusting or running bar, B, pivoted at its upper end to one side of the beam, while its lower end may be either formed with a foot, $a$, or provided with a frictional roll, which, when in use, rests upon the ground.

To the runner or adjusting bar B, midway its length, or thereabout, is articulated the lower end of a sliding or adjustable arm, B', which is preferably provided with an elongated slot, $b$, which receives a bolt, $c$, working in the beam A, with one end headed and provided with a washer, $c'$, resting against the outer side of said arm. The other end of said bolt has a thumb or adjusting nut, $c^2$, to effect the raising and lowering directly of said arm, and to accordingly affect indirectly the runner or adjusting bar B, and it will be seen that the beam may be raised, so as to clear the shovels or plows off from the ground, by lowering the runner when the cultivator or plow is drawn from one place to another, while the runner may be raised, as shown in dotted lines in Fig. 2, when the cultivator or plow is in use. Each beam is provided with a similar attachment, as just described.

The forward end of each beam A is adjustably connected by an eye-strap, $f$, on the upper and lower sides of the beam, and by a pin, $f'$, to the slotted or serially-apertured block $g'$ of a sleeve, $g$, fitted to move in an upward arc upon a short horizontal arm, $n'$, of a vertical sleeve, $n$, within which fits the axis or spindle $n^2$ of the caster-wheel C of that side of the implement. The opposite side of said arm $n'$ is bolted to the lower end of one side bar of the yoke E, of the form usually employed in the class of cultivators hereinbefore referred to.

Upon one (the outer) end of the sleeve $g$ is a projection or stop, $i$, which, together with a vertical pin or bolt, $i'$, passed transversely through and projecting from the upper and lower sides of the axial arm $n'$, and against which the projection or stop $i$ strikes, limits the tilt of the arched axle or yoke.

The connection between the team and the implement is effected by means of the whiffle-tree or trace hooks F, from the rearwardly-pointing beaks of which depend link-shaped pendants $j$, which are adapted to close the entrance to said hooks, to confine the hitching-link therein. The opposite forked ends of these hooks are connected to the spindles $n^2$, as are also oblique braces $k'$, extending from the yoke E, said hooks F being so fitted upon said spindles as to serve as levers in turning the track or caster wheels C, and therefore to effect the guiding of the latter by the team, whereby the use of a tongue or pole is obviated in applying the draft and controlling the movement of the implement. Each beam is supplied with three (more or less) standards, $l$, having shovels or plow-feet of any approved form, the standards of each beam being disposed successively in advance of each other, and one upon the inner side, and the others upon the outer side, of said beam. The two forward standards of each beam are offset by rods or bolts $m$, bolted to said standards and beam, and intermediate sleeves or cylinders $m'$, inserted upon said rods or bolts, with their ends resting against said beams and standards. These standards are also adjustably connected to their beams, to vary the angle of inclination to the ground of the standards, individually or separately, by means of the braces $n$, with their upper ends pivoted to said beams, and their lower ends provided with a number of apertures, $o$, and entering keepers or staples $o'$, fastened to said standards, and through the sides of which are inserted pins $p$, passing through the coincident apertures of the braces.

G G are the guiding-handles, also adjustably connected to said beams at or near the rear ends of the latter, as shown, to adapt them to the plowman as to height or other requirements.

I am aware that it is not broadly new to construct plows or cultivators with a pivoted runner-arm which may be raised or lowered, lowering or raising the plows or shovels, and I do not wish to claim the same broadly; but

I claim—

The combination of the beam and plows or shovels, the runner-bar pivoted at one end upon the side of the beam, the bolt and thumb-nut, and the adjusting-arm pivoted at one end to the runner-bar, and having the other slotted end sliding upon the bolt, as and for the purpose shown and set forth.

In testimony that I claim the foregoing as my own I have hereunto affixed my signature in presence of two witnesses.

RUSH R. LOMAX.

Witnesses:
 J. J. FRATER,
 T. C. COLE.